United States Patent
Faigle et al.

[19]

[11] Patent Number: 6,082,759
[45] Date of Patent: Jul. 4, 2000

[54] INFLATABLE VEHICLE OCCUPANT PROTECTION DEVICE MODULE AND METHOD

[75] Inventors: Ernst M. Faigle; Diane D. Ford, both of Dryden; Thomas H. Vos, Oxford, all of Mich.

[73] Assignee: TRW Vehicle Safety Systems Inc., Lyndhurst, Ohio

[21] Appl. No.: 08/986,859

[22] Filed: Dec. 8, 1997

[51] Int. Cl.[7] .............................. B60R 21/20; B60R 21/16
[52] U.S. Cl. ...................... 280/728.3; 280/743.2
[58] Field of Search .............................. 280/728.3, 743.1, 280/743.2, 732, 728.2

[56] References Cited

U.S. PATENT DOCUMENTS 5,335,936   8/1994   Faigle .

*Primary Examiner*—Brian L. Johnson
*Assistant Examiner*—Michael Britton
*Attorney, Agent, or Firm*—Tarolli, Sundheim, Covell, Tummino & Szabo L.L.P.

[57] ABSTRACT

An inflatable vehicle occupant protection device module (10) for a vehicle includes an inflatable vehicle occupant protection device (20) having a first panel portion (24) which inflates in a first direction (A), a second panel portion (26) which, when the vehicle occupant protection device (20) is inflated, is deployed in a second direction (B) transverse to the first direction (A). A cover (60) for the vehicle occupant protection device (20) has a tear seam (66) which tears during inflation of the inflatable vehicle occupant protection device. The tear seam (66) defines a first door (82) in the cover (60). The first door (82) swings open in the second direction (B) during inflation of the inflatable vehicle occupant protection device (20). A connection (90) connects the second panel portion (26) to the first door (82) to cause the first door to pull the second panel portion in the second direction (B) as the first door swings open.

21 Claims, 3 Drawing Sheets

INFLATABLE VEHICLE OCCUPANT PROTECTION DEVICE MODULE AND METHOD

TECHNICAL FIELD

The present invention relates to an inflatable vehicle occupant protection device module and to a method for deploying an inflatable vehicle occupant protection device.

BACKGROUND OF THE INVENTION

An inflatable vehicle occupant protection device, such as an air bag, is known. Such a protection device, when inflated, helps protect a vehicle occupant in the event of sudden vehicle deceleration, such as occurs in a vehicle collision. The inflatable vehicle occupant protection device is typically deployed in a manner to help protect an occupant seated in a normal position in the vehicle. When the occupant of the seat is not seated in the normal position in the vehicle seat, commonly referred to as an "out-of-position occupant", a deploying inflatable vehicle occupant protection device may not provide as much protection to the out-of-position occupant as it would to an occupant seated in the normal position.

SUMMARY OF THE INVENTION

The present invention is an inflatable vehicle occupant protection device module for a vehicle. The inflatable vehicle occupant protection device module comprises an inflatable vehicle occupant protection device having a first panel portion which inflates in a first direction and a second panel portion which, when the vehicle occupant protection device is inflated, is deployed in a second direction transverse to the first direction. A cover for the vehicle occupant protection device has a first door. The first door swings open in the second direction during inflation of the inflatable vehicle occupant protection device. The inflatable vehicle occupant protection device module further comprises means for connecting the second panel portion to the first door to cause the first door to pull the second panel portion in the second direction as the first door swings open.

The inflatable vehicle occupant protection device further has a third panel portion which, when the inflatable vehicle occupant protection device is inflated, is deployed in a third direction opposite to the second direction. The cover further has a second door that swings open in the third direction during inflation of the inflatable vehicle occupant protection device. The inflatable vehicle occupant protection device module further comprises means for connecting the third panel portion to the second door to cause the second door to pull the third panel portion in the third direction as the second door swings open.

According to one embodiment of the invention, the means for connecting the second and third panel portions to the first and second doors, respectively, comprises hook and loop fasteners.

According to another embodiment of the invention, the means for connecting the second and third panel portions to the first and second doors, respectively, comprises DUAL LOCK FASTENING SYSTEM brand fasteners.

According to yet another embodiment of the invention, the means for connecting the second and third panel portions to the first and second doors, respectively, comprises an adhesive material.

The present invention further provides a method for deploying an inflatable vehicle occupant protection device having first, second, and third panel portions. During deployment of the inflatable vehicle occupant protection device, the second and third panel portions are pulled in opposite directions by first and second doors, respectively, of a cover, for the protection device.

BRIEF DESCRIPTION OF THE DRAWINGS

The foregoing and other features of the present invention will becomes apparent to one skilled in the art to which the present invention relates upon consideration of the following description of the invention with reference to the accompanying drawings, wherein.

DESCRIPTION OF PREFERRED EMBODIMENTS

The present invention is an inflatable vehicle occupant protection device module and a method for deploying an inflatable vehicle occupant protection device of the module. The present invention is applicable to inflatable vehicle occupant protection device modules of various constructions. As representative of one such construction, FIG. 1 illustrates an inflatable vehicle occupant protection device module 10 located in an instrument panel 12 of a vehicle (not shown).

Figure 1:
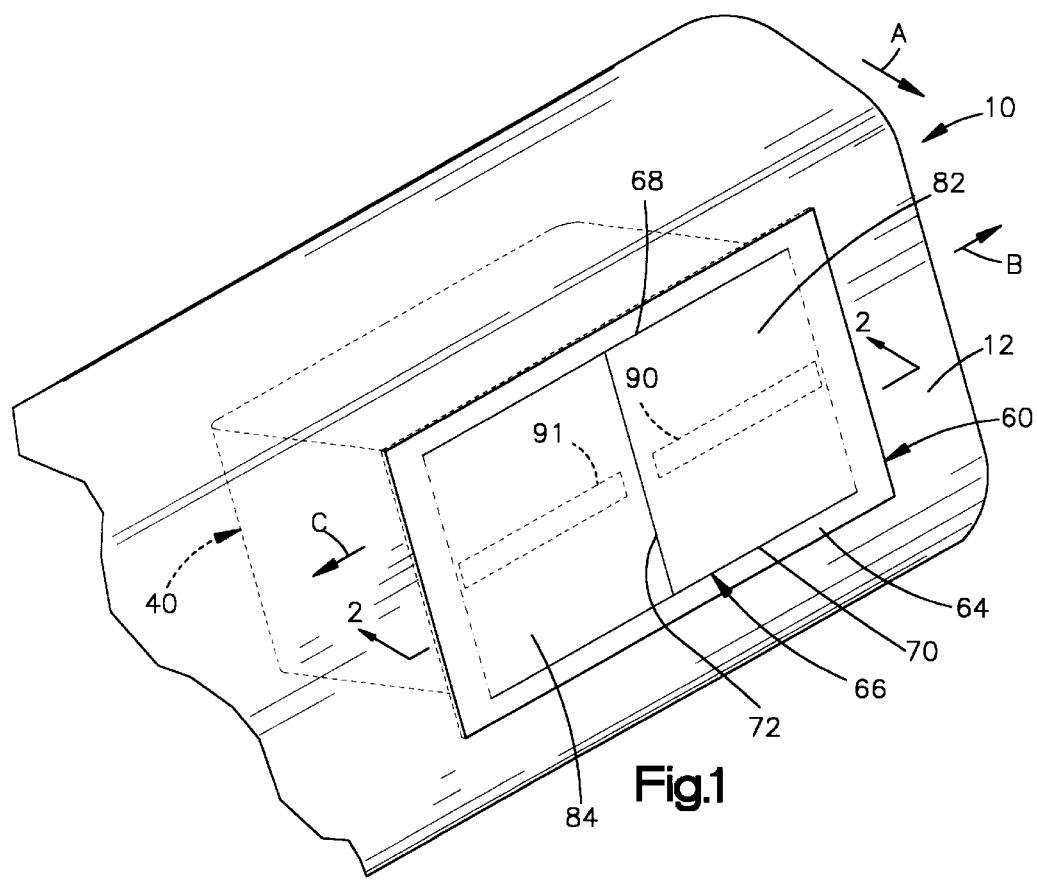
FIG. 1 is a schematic perspective view of an inflatable vehicle occupant protection device module located in an instrument panel of a vehicle.
Figure 2:
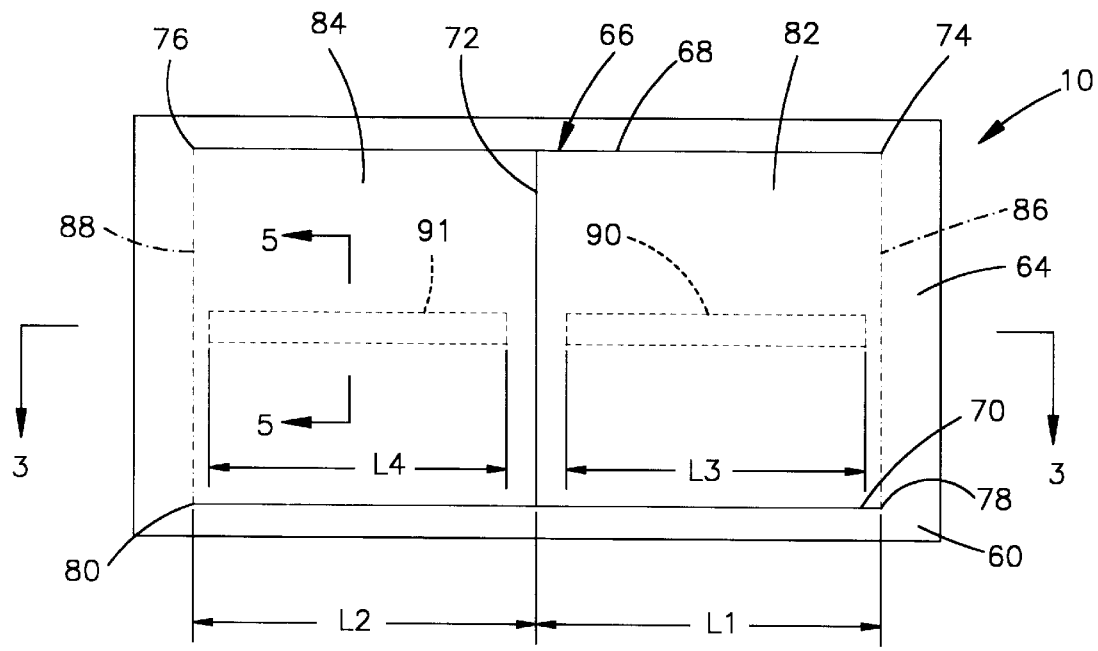
FIG. 2 is a schematic view of the inflatable vehicle occupant protection device module of FIG. 1 taken along line 2—2 of FIG. 1.
Figure 3:
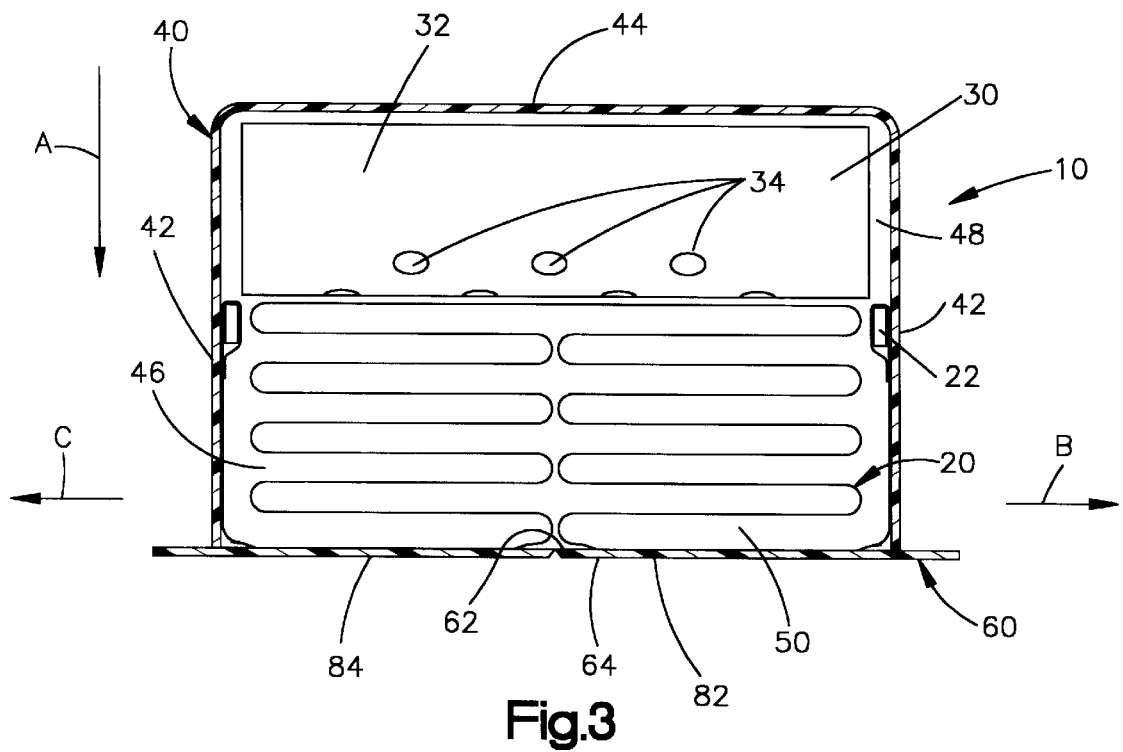
FIG. 3 is a schematic sectional view taken along line 3—3 of FIG. 2 showing the inflatable vehicle occupant protection device of the module in an undeployed condition.

The inflatable vehicle occupant protection device module 10 comprises an inflatable vehicle occupant protection device, such as an air bag 20 (FIG. 3), an inflator 30 for inflating the air bag, a reaction canister 40 for containing the air bag and the inflator, and a cover 60 for covering the air bag (FIGS. 1–3).

The reaction canister 40 is a metal enclosure having a rectangular cross-section. The reaction canister 40 is defined by four side walls 42 (not all are visible in the Figures) and a base wall 44. The reaction canister 40, opposite the base wall 44, is open and defines a rectangular opening through which the air bag 20 deploys. The four side walls 42 and the base wall 44 together define a chamber 46 in the reaction canister 40. The chamber 46 in the reaction canister 40 has a first portion 48 adjacent the base wall 44 and a second portion 50 adjacent the opening through which the air bag 20 deploys.

The inflator 30 is disposed in the first portion 48 of the chamber 46 in the reaction canister 40 and is secured in the reaction canister in a known manner (not shown). The inflator 30 has a cylindrical outer surface 32 and a plurality of outlet openings 34 located in the cylindrical outer surface. The inflator 30 is actuatable by circuitry (not shown) to provide inflation fluid for inflating the air bag 20. The inflation fluid exits the inflator 30 through the plurality of outlet openings 34.

The air bag 20, in an undeployed condition, is folded and placed in the second portion 50 of the chamber 46 in the reaction canister 40. The air bag 20 is secured to the reaction canister 40 by a rectangular bag retainer 22 as is known in the art. The air bag 20 is inflatable by inflation fluid from the inflator 30.

Figure 4:
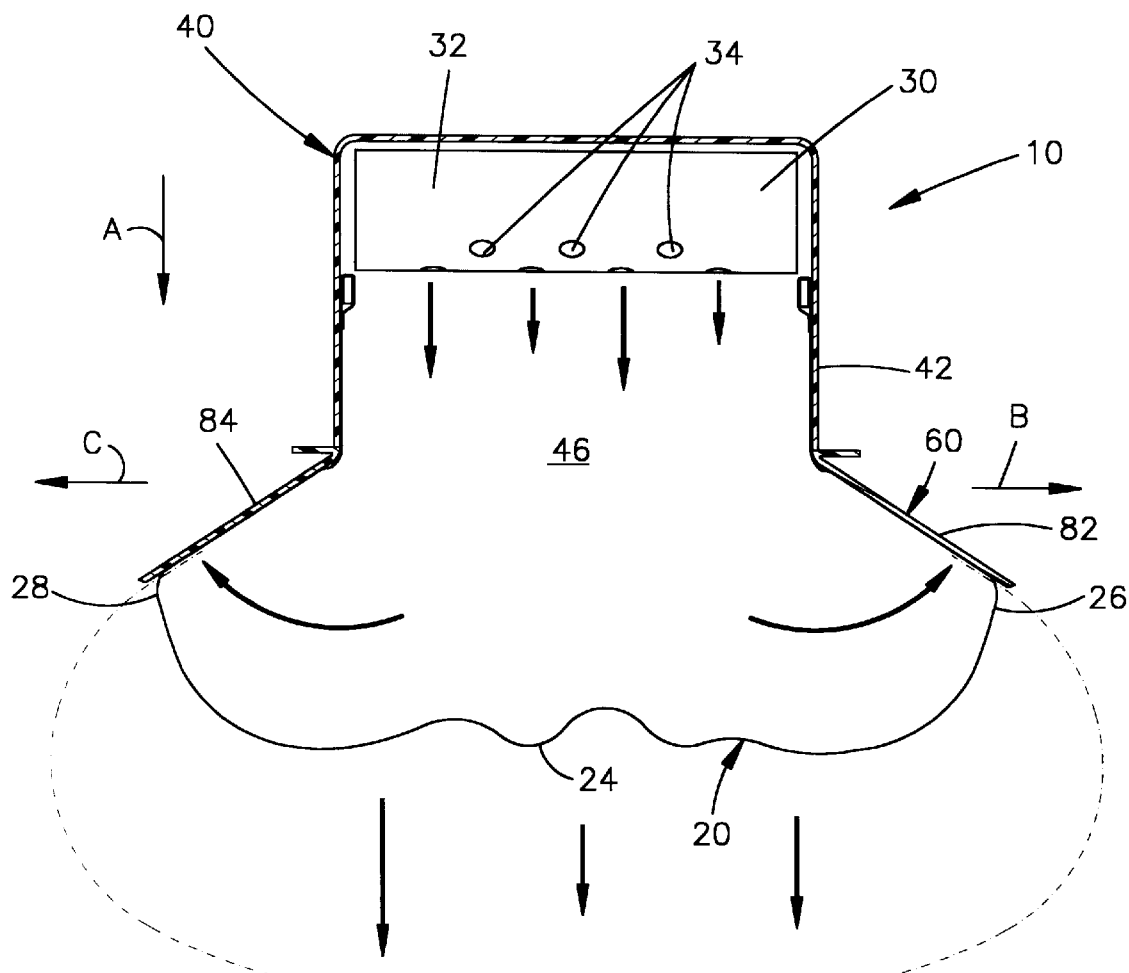
FIG. 4 is a view similar to FIG. 3 showing the inflatable vehicle occupant protection device of the module in a partially deployed condition.

The air bag 20 is made of a known material, such as woven nylon, and includes a first panel portion 24, a second panel portion 26, and a third panel portion 28 (FIG. 4). The first panel portion 24, the second panel portion 26, and the third panel portion 28 may be portions of a single piece of the material of the air bag 20, or may be made from separate pieces of the air bag material sewn together.

The first panel portion 24 is centrally located and, when the air bag 20 is inflated, inflates rearwardly of the vehicle in a first direction indicated by arrow A in FIGS. 1 and 4. The second panel portion 26 is disposed adjacent the first panel portion 24 and, when the air bag 20 is inflated, deploys laterally of the vehicle in a second direction, indicated by arrow B in FIGS. 1 and 4, which is transverse to the first direction. The third panel portion 28 is also disposed adjacent the first panel portion 24, but on an opposite side of the first panel portion 24 from the second panel portion 26. When the air bag 20 is inflated, the third panel portion 28 deploys laterally of the vehicle in a third direction, indicated by arrow C in FIGS. 1 and 4, which is opposite the second direction, indicated by the arrow B, in which the second panel portion 26 deploys.

The cover 60 which covers the air bag 20 in the inflatable vehicle occupant protection device module 10 is attached to the reaction canister 40 in a known manner (not shown). The cover 60 could alternatively be attached to the instrument panel 12. The cover 60 is a substantially planar part extending laterally of the vehicle. The cover 60 has inner and outer surfaces 62 and 64, respectively. The inner surface 62 faces the folded air bag 20 in the chamber 46 in the reaction canister 40.

The outer surface 64 of the cover 60 faces rearwardly of the vehicle and includes a tear seam 66 (FIGS. 1 and 2) which tears during inflation of the air bag 20. The tear seam 66 has an I-shape defined by parallel upper and lower seam sections 68 and 70, respectively, which are connected by a central seam section 72. The upper and lower seam sections 68 and 70 extend laterally of the vehicle. The upper seam section 68 has first and second terminal ends 74 and 76, respectively. Similarly, the lower seam section 70 has first and second terminal ends 78 and 80, respectively. The central seam section 72 extends perpendicular to and between the upper and lower seam sections 68 and 70.

The I-shaped tear seam 66 defines first and second doors 82 and 84, respectively, in the cover. The first door 82 is defined on one side of the central seam section 72. The first door 82 has a hinge area 86, indicated in dotted lines in FIGS. 1 and 2, extending between the first terminal ends 74 and 78 of the upper and lower seam sections 68 and 70, respectively. The first door 82 has a lateral length L1 (FIG. 2) measured between the central seam section 72 and the hinge area 86.

The second door 84 is defined in the cover 60 on the opposite side of the central seam section 72 from the first door 82. The second door 84 has a hinge area 88, indicated in dotted lines in FIGS. 1 and 2, extending between the second terminal ends 76 and 80 of the upper and lower seam sections 68 and 70, respectively. The second door 84 has a lateral length L2 (FIG. 2), measured between the central seam section 72 and the hinge area 88, which is approximately equal to the length L1 of the first door 82.

It should be apparent to those skilled in the art that the tear seam 66 which defines the first and second doors 82 and 84 could alternatively be located in the inner surface 62 of the cover 60 rather than the outer surface 64.

In accordance with a first embodiment of the present invention, the first and second doors 82 and 84 of the cover 60 are connected with the second and third panel portions 26 and 28, respectively, of the air bag 20 by hook and loop fasteners 90, 91. Preferably, the hook and loop fasteners 90, 91 are VELCRO brand fasteners manufactured by Velcro USA Inc. of New York, N.Y.

First and second portions (not shown) of the hook and loop fastener 90 connect the second panel portion 26 of the air bag 20 to the first door 82 of the cover 60. The first portion of the hook and loop fastener 90 is attached to the second panel portion 26 of the air bag 20 by conventional means such as an adhesive material or by sewing. The second portion of the hook and loop fastener 90 is attached to the first door 82 by conventional means such as an adhesive material. The first and second portions of the hook and loop fastener 90 are in the form of strips which extend laterally of the vehicle. The first and second portions of the hook and loop fastener 90 have a lateral length L3 (FIG. 2) which is slightly less than the length L1 of the first door 82.

Figure 5:
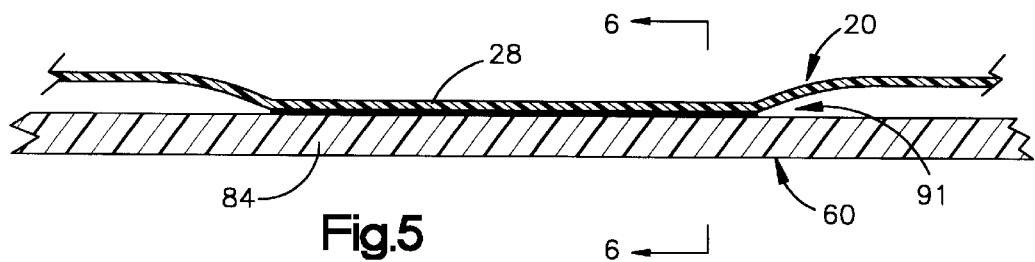
FIG. 5 is an enlarged sectional view taken along line 5—5 of FIG. 2 illustrating a portion of the inflatable vehicle occupant protection device module.
Figure 6:
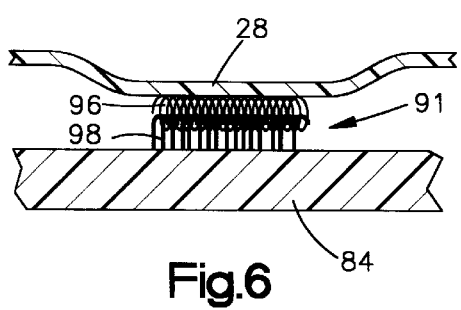
FIG. 6 is an enlarged sectional view taken along line 6—6 of FIG. 5 illustrating a first embodiment of the present invention.

Third and fourth portions 96 and 98, respectively, (FIGS. 5 and 6) of the hook and loop fastener 91 connect the third panel portion 28 of the air bag 20 to the second door 84 of the cover 60. The third portion 96 of the hook and loop fastener 91 is attached to the third panel portion 28 of the airbag 20 by conventional means such as an adhesive material or by sewing. The fourth portion 98 of the hook and loop fastener 91 is attached to the second door 84 by conventional means such as an adhesive material. The third and fourth portions 96 and 98 of the hook and loop fastener 91 are in the form of strips which extend laterally of the vehicle. The third and fourth portions 96 and 98 of the hook and loop fastener 91 have a lateral length L4 (FIG. 2) which is slightly less than the length L2 of the second door.

Under normal driving conditions, the air bag 20 is in the undeployed condition illustrated in FIG. 3. Upon the occurrence of one or more conditions indicative of a vehicle collision, the inflator 30 is actuated and provides inflation fluid to inflate the air bag 20. As the air bag 20 inflates, the air bag 20 pushes against the inner surface 62 of the cover 60, causing the upper seam section 68, the lower seam section 70, and the central seam section 72 of the tear seam 66 to rupture. As the tear seam 66 ruptures, the first door 82 swings open at its hinge area 86 and the second door 84 swings open at its hinge area 88. The first and second doors 82 and 84 swing open laterally of the vehicle and in opposite directions (indicated by arrows B and C, respectively).

As the first and second doors 82 and 84 swing open, the first panel portion 24 of the air bag 20 inflates rearwardly of the vehicle in the first direction, indicated by the arrow A (FIG. 4). Simultaneously, the second and third panel portions 26 and 28 of the air bag 20 deploy laterally of the vehicle in opposite directions. More particularly, the second panel portion 26, which is connected to the first door 82 by the first and second portions of the hook and loop fasteners 90, is pulled in the second direction, indicated by the arrow B, by the swinging movement of the first door and deploys laterally of the vehicle in the second direction. Meanwhile, the third panel portion 28, which is connected to the second door 84 by the third and fourth portions 96 and 98 of the hook and loop fasteners 90, is pulled in the third direction, indicated by the arrow C, by the swinging movement of the second door and deploys laterally of the vehicle in the third direction.

The lateral pulling action on the second and third panel portions 26 and 28 by the first and second doors 82 and 84, respectively, spreads the air bag 20 laterally during inflation. In the laterally spread condition, the deployed air bag 20 is in a configuration to help protect an out-of-position occupant from injury resulting from the vehicle collision.

Figure 7:
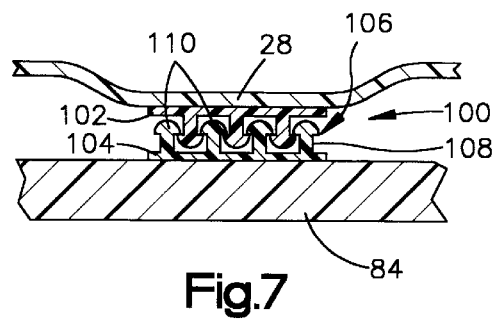
FIG. 7 is a view similar to FIG. 6 illustrating a second embodiment of the present invention.

FIG. 7 illustrates a second embodiment of the present invention. In the embodiment of FIG. 7, reference numbers identical to those of the embodiment of FIGS. 1–6 are used to designate parts which are identical to parts found in the embodiment of FIG. 7.

According to the second embodiment, the second and third panel portions 26 and 28 of the air bag 20 are connected to the first and second doors 82 and 84, respectively, with DUAL LOCK FASTENING SYSTEM brand fasteners 100 manufactured and sold by the 3M Company of Minneapolis, Minn.

The DUAL LOCK FASTENING SYSTEM brand fasteners 100 comprise a pair of opposing strips 102, 104 having a plurality of connecting members 106. Each connecting member 106 has a cylindrical stem portion 108 and a hemispherical head portion 110. The head portions 110 of several of the connecting members 106 snap between the head portions of opposing connecting members as shown in FIG. 7 to interlock the opposing strips 102, 104 of the fasteners 100.

The opposing strips 102, 104 of the DUAL LOCK FASTENING SYSTEM brand fasteners 100 are attached to the panel portions 26, 28 and the doors 82, 84 in the same locations and in the same manner as the hook and loop fasteners 90, 91 in the first embodiment. The DUAL LOCK FASTENING SYSTEM brand fasteners 100 function similar to the hook and loop fasteners 90, 91 to ensure that the second and third panel portions 26 and 28 are pulled laterally in opposite directions when the first and second doors 82 and 84, respectively, swing open.

In a third embodiment of the present invention, an adhesive material connects the second and third panel portions 26 and 28 with the first and second doors 82 and 84, respectively. The adhesive material is preferably silicon based. The adhesive material is adhered to the panel portions 26, 28 and the doors 82, 84 in substantially the same areas where the hook and loop fasteners 90, 91 and the DUAL LOCK FASTENING SYSTEM brand fasteners 100 are found in the previous embodiments (see FIG. 5). The adhesive material functions similar to the fasteners 90, 91 and 100 described above to ensure that the second and third panel portions 26 and 28 are pulled laterally in opposite directions when the first and second doors 82 and 84, respectively, swing open.

From the above description of the invention, those skilled in the art will perceive improvements, changes and modifications. For example, it is contemplated that the inflatable vehicle occupant protection device module 10 described above could be mounted in a vehicle door, a B-pillar, or the roof above a vehicle door to provide protection to the vehicle occupant during a side impact collision. Such improvements, changes and modifications within the skill of the art are intended to be covered by the appended claims.

Having described the invention, we claim:

1. An inflatable vehicle occupant protection device module for a vehicle, said inflatable vehicle occupant protection device module comprising:

an inflatable vehicle occupant protection device, said inflatable vehicle occupant protection device having a first panel portion which inflates in a first direction and a second panel portion which, when said inflatable vehicle occupant protection device is inflated, is deployed in a second direction transverse to said first direction;

a cover fixed to the vehicle for covering said inflatable vehicle occupant protection device, said cover having a first door connected to said cover by a first hinge area, said first door swinging open about said first hinge area and in said second direction during inflation of said inflatable vehicle occupant protection device; and means for connecting said second panel portion to said first door, said means for connecting said second panel portion to said first door, during inflation of said inflatable vehicle occupant restraint, causing said first door to pull said second panel portion in said second direction as said first door swings open about said first hinge area.

2. The inflatable vehicle occupant protection device module of claim 1 wherein said inflatable vehicle occupant protection device further has a third panel portion which, when said inflatable vehicle occupant protection device is inflated, is deployed in a third direction opposite to said second direction, said cover further having a second door connected to said cover by a second hinge area, said second door swinging open about said second hinge area and in said third direction during inflation of said inflatable vehicle occupant protection device, said inflatable vehicle occupant protection device module further comprising means for connecting said third panel portion to said second door, said means for connecting said third panel portion to said second door, during inflation of said inflatable vehicle occupant restraint causing said second door to pull said third panel portion in said third direction as said second door swings open about said second hinge area.

3. The inflatable vehicle occupant protection device module of claim 2 wherein said means for connecting said second and third panel portions to said first and second doors, respectively, comprises hook and loop fasteners, a first portion of said hook and loop fasteners being attached to said second panel portion, a second portion of said hook and loop fasteners being attached to said first door, a third portion of said hook and loop fasteners being attached to said third panel portion, a fourth portion of said hook and loop fasteners being attached to said second door.

4. The inflatable vehicle occupant protection device module of claim 2 wherein said means for connecting said second and third panel portions to said first and second doors, respectively, comprises opposing fastener strips having a plurality of interlocking connecting members, each connecting member having a cylindrical stem portion and a hemispherical head portion, a first portion of said opposing fastener strips being attached to said second panel portion, a second portion of said opposing fastener strips being attached to said first door, a third portion of said opposing fastener strips being attached to said third panel portion, a fourth portion of said opposing fastener strips being attached to said second door.

5. The inflatable vehicle occupant protection device module of claim 3 wherein said means for connecting said second and third panel portions to said first and second doors, respectively, comprises an adhesive material.

6. The inflatable vehicle occupant protection device module of claim 5 wherein said adhesive material is silicon based.

7. The inflatable vehicle occupant protection device module of claim 3 wherein said cover has a tear seam which tears during inflation of said inflatable vehicle occupant protection device, said tear seam defining said first and second doors in said cover.

8. The inflatable vehicle occupant protection device module of claim 1 wherein said means for connecting said second panel portion to said first door comprises hook and loop fasteners, a first portion of said hook and loop fasteners being attached to said second panel portion and a second portion of said hook and loop fasteners being attached to said first door.

9. The inflatable vehicle occupant protection device module of claim 1 wherein said means for connecting said second panel portion to said first door comprises opposing fastener strips having a plurality of interlocking connecting members, each connecting member having a cylindrical stem portion and a hemispherical head portion, a first portion of said opposing fastener strips being attached to said second panel portion and a second portion of said opposing fastener strips being attached to said first door.

10. The inflatable vehicle occupant protection device module of claim 3 wherein said means for connecting said second panel portion to said first door comprises an adhesive material.

11. A method comprising the steps of:
providing a inflatable vehicle occupant protection device in a vehicle, said inflatable vehicle occupant protection device having a first panel portion and a second panel portion;
providing a cover for said inflatable vehicle occupant protection device, said cover being fixed to the vehicle and having a tear seam defining a first door in said cover, said first door being connected to said cover by a first hinge area;
connecting said second panel portion of said inflatable vehicle occupant protection device to said first door of said cover; and
inflating said inflatable vehicle occupant protection device and causing said first panel portion of said inflatable vehicle occupant protection device to inflate in a first direction and causing said first door to swing open about said first hinge area in a second direction transverse to said first direction;
said step of inflating said inflatable vehicle occupant protection device causing said second panel portion of said inflatable vehicle occupant restraint to be pulled in said second direction by said first door and to inflate in said second direction.

12. The method of claim 11 further comprising the steps of:
providing said inflatable vehicle occupant protection device with a third panel portion;
providing said cover with a second door defined by said tear seam, said second door being connected to said cover by a second hinge area;
connecting said third panel portion of said inflatable vehicle occupant protection device to said second door of said cover;
said step of inflating said inflatable vehicle occupant protection device further comprises causing said second door to swing open about said second hinge area in a third direction opposite to said second direction, said third panel portion of said inflatable vehicle occupant protection device being pulled in said third direction by said second door and inflating in said third direction.

13. The method of claim 12 wherein the step of connecting said second panel portion of said inflatable vehicle occupant protection device to said first door of said cover includes attaching hook and loop fasteners to said second panel portion and to said first door.

14. The method of claim 13 wherein the step of connecting said third panel portion of said inflatable vehicle occupant protection device to said second door of said cover includes attaching hook and loop fasteners to said third panel portion and to said second door.

15. The method of claim 12 wherein the step of connecting said second panel portion of said inflatable vehicle occupant protection device to said first door of said cover includes attaching opposing fastener strips to said second panel portion and to said first door, each of said opposing fastener strips having a plurality of interlocking connecting members, each connector member having a cylindrical stem portion and a hemispherical head portion.

16. The method of claim 15 wherein the step of connecting said third panel portion of said inflatable vehicle occupant protection device to said second door of said cover includes attaching opposing fastener strips to said third panel portion and to said second door, each of said opposing fastener strips having a plurality of interlocking connecting members, each connector member having a cylindrical stem portion and a hemispherical head portion.

17. The method of claim 12 wherein the step of connecting said second panel portion of said inflatable vehicle occupant protection device to said first door of said cover includes adhering an adhesive material to said second panel portion and to said first door.

18. The method of claim 17 wherein the step of connecting said third panel portion of said inflatable vehicle occupant protection device to said second door of said cover includes adhering an adhesive material to said third panel portion and to said second door.

19. The method of claim 11 wherein the step of connecting said second panel portion of said inflatable vehicle occupant protection device to said first door of said cover includes attaching hook and loop fasteners to said second panel portion and to said first door.

20. The method of claim 11 wherein the step of connecting said second panel portion of said inflatable vehicle occupant protection device to said first door of said cover includes attaching opposing fastener strips to said second panel portion and to said first door, each of said opposing fastener strips having a plurality of interlocking connecting members, each connector member having a cylindrical stem portion and a hemispherical head portion.

21. The method of claim 11 wherein the step of connecting said second panel portion of said inflatable vehicle occupant protection device to said first door of said cover includes adhering an adhesive material to said second panel portion and to said first door.

\* \* \* \* \*

UNITED STATES PATENT AND TRADEMARK OFFICE
CERTIFICATE OF CORRECTION

PATENT NO. : 6,082,759
DATED : July 4, 2000
INVENTOR(S) : Ernst M. Faigle, Diane D. Ford, Thomas H. Vos It is certified that error appears in the above-identified patent and that said Letters Patent is hereby corrected as shown below:

Column 7:
Line 2, change "3" to "2"
Line 9, change "3" to "2"
Line 30, change "3" to "2"

Signed and Sealed this

Nineteenth Day of June, 2001

Attest:

*Attesting Officer*

NICHOLAS P. GODICI
*Acting Director of the United States Patent and Trademark Office*